United States Patent Office 3,415,207
Patented Dec. 10, 1968

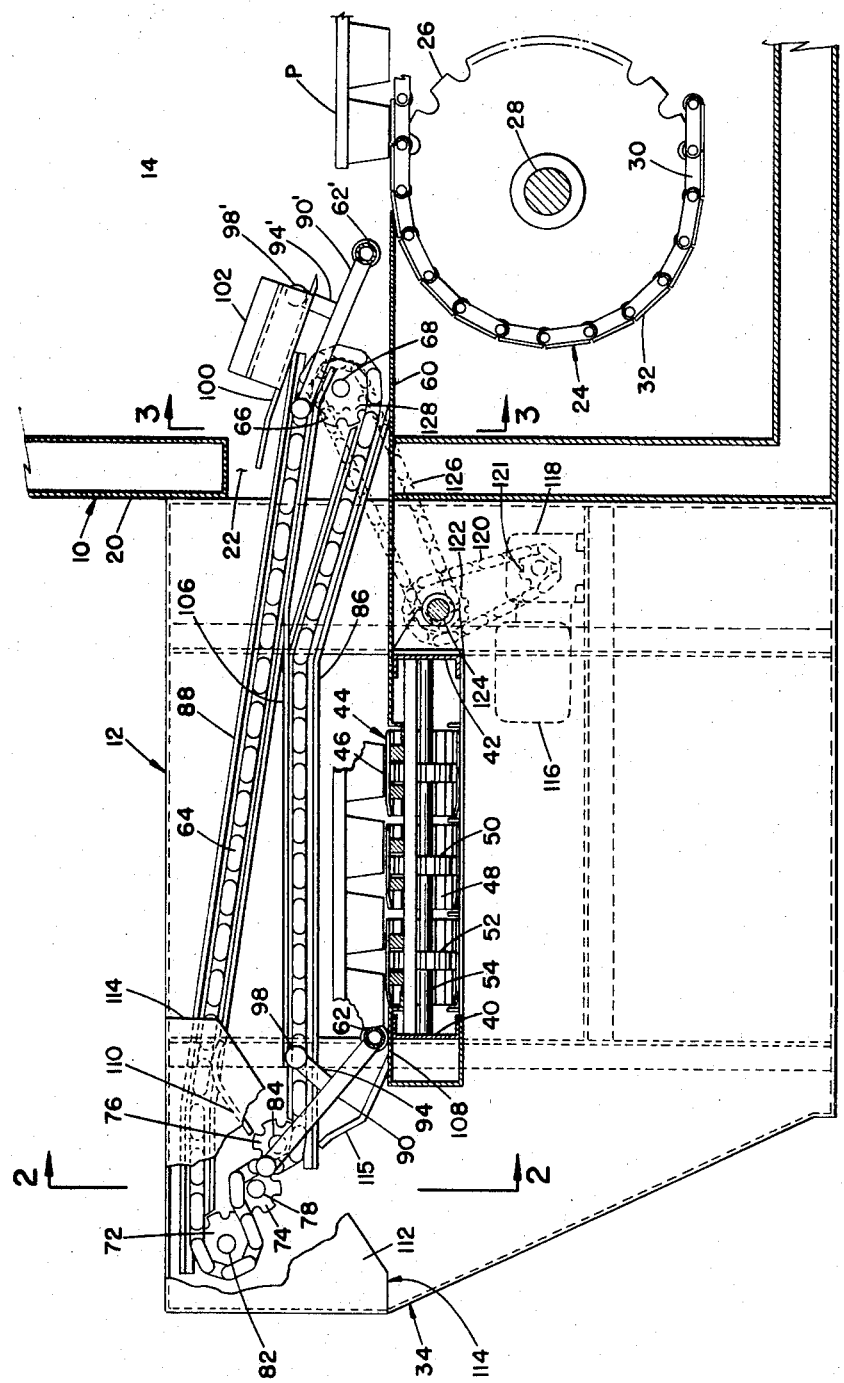

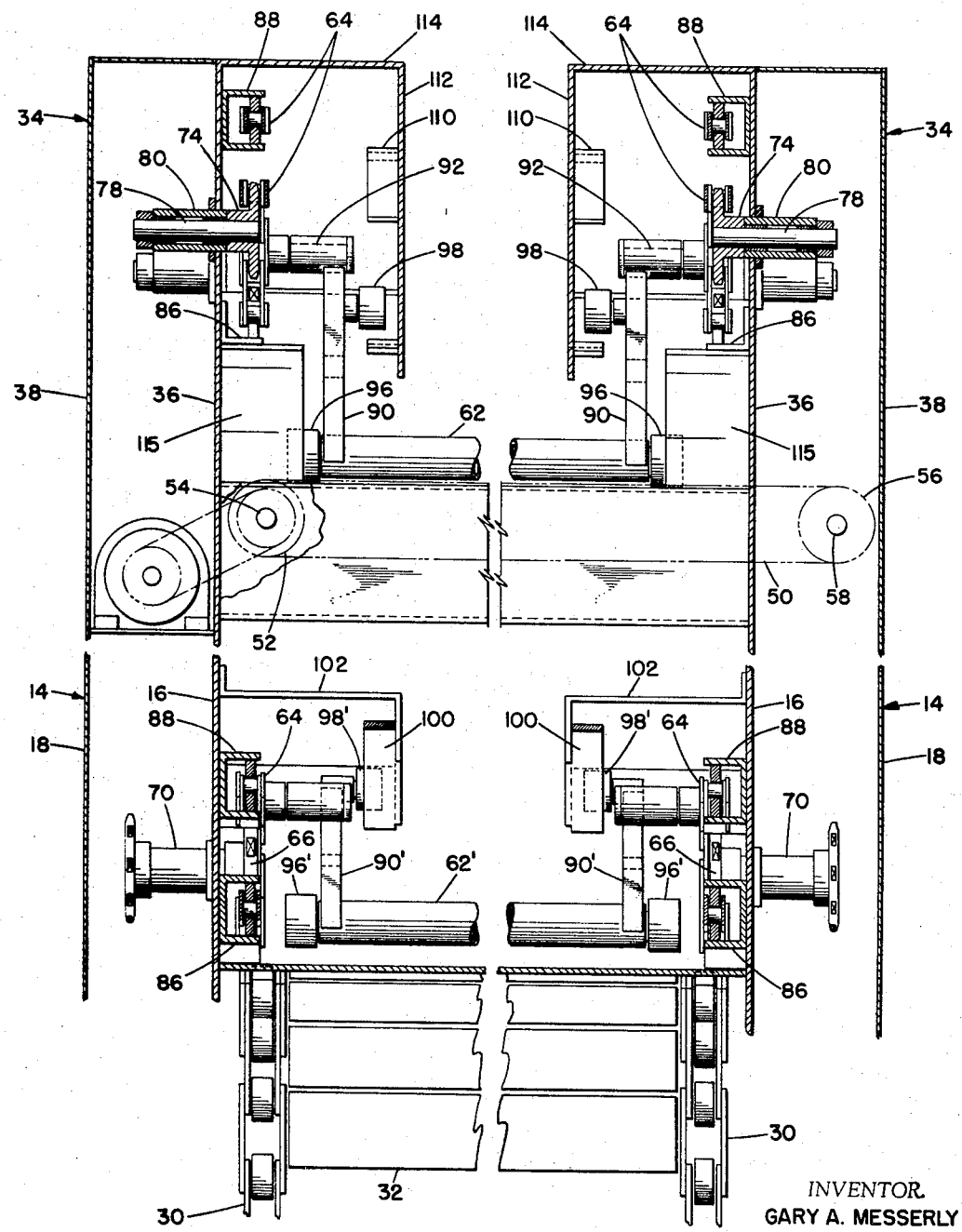

3,415,207
LEVEL PLANE OVEN LOADER
Gary A. Messerly, York, Pa., assignor to Read Corporation, York, Pa., a corporation of Delaware
Filed Nov. 17, 1966, Ser. No. 595,146
6 Claims. (Cl. 107—57)

ABSTRACT OF THE DISCLOSURE

A loader mounted outside and adjacent the front wall of an oven including an outer pan supporting surface for receiving successive transverse rows of pans of dough and an inner pan support extension projecting through the lower portion of a transversely elongated loading opening in the oven front wall. A transversely extending pusher bar is adapted to be moved across the outer and inner pan supports for pushing successive rows of pans thereacross onto means for traveling the pans of dough through the oven and is adapted to be retracted in a path spaced above the outer pan support to permit a succeeding row of pans to be delivered in front of the oven. The means controlling the movement of the pusher bar includes a pair of transversely spaced longitudinally extending endless chains having an outer portion guided in a path spaced above the outer pan support and an inner portion guided in a path sloping downwardly over the inner pan support. Control arms are pivotally connected at one end of the chains and attached at the other end to opposite ends of the pusher bar, and guide shoes at opposite ends of the chains cooperate with guide members carried by the pusher bar and control arms for raising the pusher bar at the beginning of its retracting path and lowering the pusher bar at the beginning of its pushing path.

---

This invention relates to loaidng apparatus for introducing into large commercial type baking oven successive rows of pans containing proofed dough, and more particularly wherein the rows of pans are brought into position in front of the oven loading opening on a transversely traveling endless conveyor.

An object of the invention is to provide a simple, economically manufactured and efficiently functioning loading apparatus including a pan pushing bar operating in a loading path for engaging and pushing into the oven a row of pans delivered in front of the oven by a transversely traveling endless conveyor, and operating in a retracting elevated path over a succeeding row of pans being delivered by the conveyor.

Loading apparatus of the type described customarily includes hinged movable track switching means disposed in the path of the pusher bar or its associated elements on the pushing stroke of the pusher bar to provide for retraction of the pusher bar in an elevated path. The forceful striking of the movable switching means by the moving pusher bar or its associated elements to deflect the switching means and the striking of the switching means with the pan supporting surface or other rigid element of the loader on return of the switching means from its deflected position creates excessive noise and furthermore results in jarring of the loading apparatus which in being transmitted to the pans of proofed dough can cause the sensitive raised dough to fall. An important object of the invention is to provide a loading apparatus wherein such objectionable features are eliminated or substantially minimized.

A further object is to provide improved loading pusher transfer means for transferring the loading pusher from a pan loading pushing path to an elevated retracting path in which hinged movable track switching means is dispensed with whereby possible malfunctioning of such means with consequent malfunctioning of the loader is eliminated.

Another object is to provide a novel and improved loader construction of the character described having a forward portion outside the oven and a rearward portion extending into the oven, in which the forward portion is disposed at an elevation above the transversely traveling pan conveyor to permit rows of pans to be delivered beneath the loader to a position in front of the oven opening and in which the rearward portion extends through and slopes downwardly and rearwardly to a position immediately above a pan supporting shelf across which successive rows of pans are pushed into the oven from the transversely extending pan conveyor whereby to reduce the height of the oven opening to a minimum. A related object is to provide a construction as described, wherein the reach of the pusher bar beyond the rearward end of the pusher bar operating means is extended to a maximum for a given length of arms connecting the pusher bar with the operating means therefor.

Another object is to provide a loader of the character described including longitudinally extending endless chain pusher operating means adapted to have two pusher bars connected thereto and wherein each pusher bar on its retracting stroke clears the row of pans being conveyed into loading position and clears the chain connected end of the other pusher bar.

Another object is to provide a loader of the character described wherein the lower runs of the pusher bar operating endless chains include between their ends a vertically downwardly traveling run portion, whereby as the chain connected ends of the pusher bar assembly descends the vertically run portion the rate of travel of the pusher bar on its pushing stroke is reduced, the vertically chain run portion being disposed so that the pusher bar engages the pans during descent of the chain connected ends of the pusher bar assembly along said vertical chain run portion.

Other objects and advantages will become apparent from the following description, wherein a preferred embodiment of the invention is shown, reference being had to the accompanying drawings, forming a part hereof, in which:

FIGURE 1 is a longitudinal vertical sectional view through the loader and the adjacent portion of the oven to which it is applied, with parts being shown in elevation;

FIGURE 2 is a sectional view taken on line 2—2 of FIGURE 1, looking in the direction of the arrows;

FIGURE 3 is a sectional view taken on line 3—3 of FIGURE 1, looking in the direction of the arrows.

Figure 4:
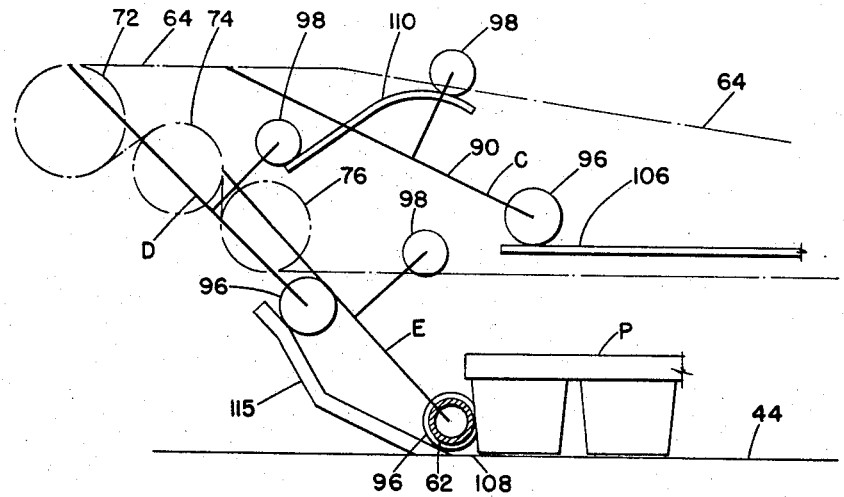
FIGURES 4 and 5 are diagrammatic views showing the pusher bar and its associated elements in different positions as the pusher bar moves from its pan pushing path to its elevated path and returns from its elevated path back to its pan pushing path.

Referring particularly to FIGURE 1, my improved loader is illustrated as applied to a commercial oven 10 of the type generally known as a tunnel oven. Since the construction of such ovens is well known, only the front portion to which the loader 12 is applied is shown in the drawings.

The oven 10 is generally longitudinally elongated rectangular construction which has side walls 14, each of which is formed of inner and outer spaced sheets 16 and 18 as shown in FIGURE 3, and has a front wall 20 provided with a loading opening 22 that extends the greater portion of the width of the oven. Disposed within the oven is an articulated traveling hearth 24 for conveying pans P of product to be baked through the oven. The traveling hearth 24 is led at one end around a pair of laterally spaced sprockets 26, one such sprocket being shown at the far side of the oven as viewed in FIGURE 1. The sprockets 26 are mounted on a transversely extending shaft 28 suitably mounted in the lower forward portion of the oven. A similar shaft and sprocket arrangement, not shown, for the traveling hearth is suitably mounted in the lower rearward portion of the oven. The sprockets 26 and the similar sprockets at the rearward end of the oven have endless chains 30 trained thereover, articulately supporting hearth members 32 of conventional plate or grid construction.

Extending forwardly of the lower portion of the oven front wall 20 at each side of the loading opening therein are generally rectangular compartments 34 of suitable sheet metal and angle iron construction. The inner and outer sheets 36 and 38 of the compartments 34 are in effect extensions of the inner and outer sheets 16 and 18 of the oven side walls 14. Spanning the space between the compartments 34 at approximately the level of the bottom of the oven loading opening 22 are longitudinally spaced transversely extending front and rear channels 40 and 42 suitably secured at their ends to structural elements of the compartments 34 providing support means for a generally horizontal pan supporting surface 44 across which successive rows of pans are pushed through the loading opening 22 onto the traveling hearth 24.

The pan supporting surface 44 includes a transversely extending endless conveyor 46, disposed outside the oven between the front and rear channels 40 and 42 arranged to convey successive rows of pans from one side of the oven into position in front of the oven loading opening 22 preparatory to being loaded into the oven. The endless conveyor 46 is illustrated as a table top conveyor, though it may be a slat or other suitable type of conveyor, and comprises a plurality of plates 48 respectively connected to the links of chains 50. The chains 50 are trained around sprockets 52 fixed on a shaft 54 that is driven from an electric motor as shown in FIG. 2 journaled in suitable bearings carried by one end of the channels 40 and 42, and around sprockets 56 fixed on a shaft 58 that is journaled in suitable bearings carried by the other end of the channels 40 and 42.

The pan supporting surface 44 also includes a plate like shelf 60 secured in suitable manner on the rear channel 42 and that extends rearwardly from adjacent the rearward side of the top run of the endless conveyor 46 through the loading opening 22 to a position immediately above the forward end of the top run of the traveling hearth 24 of the oven. An elongated transversely extending pusher bar 62 of the loader 12 is mounted and operated in a manner hereinafter described for movement in a path rearwardly across and in close proximity to the pan supporting surface 44 to push successive rows of pans from the top run of the endless conveyor 46 across the plate like shelf 60 onto the traveling hearth 24 of the oven, and in a forward elevated path above the level of a succeeding row of pans that is being conveyed to a position in front of the loading opening 22 by the endless conveyor 46.

The driving means for operating the pusher bar 62 includes a pair of longitudinally elongated endless chains 64, each being disposed in a vertical longitudinally extending plane adjacent the inwardly facing side of the inner sheet 36 of a respective compartment 34 as best shown in FIGURE 2. The rearward end portion of each of the chains 64 extends through the oven loading opening and as shown in FIGURE 3, is disposed adjacent the inwardly facing side of the inner sheet 16 of a respective oven side wall 14. Each endless chain 64 is trained at its rearmost end around a sprocket 66 that is preferably disposed as near above the loading shelf 60 as practicable. This has the advantage of reducing the vertical extent of the loading opening 22 and the further advantage, hereinafter adverted to in more detail, of extending the reach of the pusher bar 62 into the oven. The sprockets 66 are fixed on stub shafts 68 journaled in bearings 70 carried by the inner sheets 16 of oven side walls 14. Each endless chain 64 is trained at its foremost end over a set of three sprockets 72, 74 and 76 disposed rearward of and above the level of the horizontal pan supporting surface 44, and arranged in descending step-wise fashion from front to rear, as best shown in FIGURE 1. More specifically, the endless chains 64 pass over the upper peripheral portion of the sprockets 74 and the lower peripheral portion of the sprockets 76, to provide in the chains 64 a short vertical run portion, the purpose of which will be hereinafter described. The sprockets 74, as best shown in FIGURE 2, are fixed on stub shafts 78 journaled in bearings 80 carried by the inner sheets 36 of the compartments 34. The sprockets 72 and 76 are fixed on stub shafts 82 and 84 mounted in the same manner as stub shafts 78.

In order to permit the pans being delivered to the front of the oven by the transversely extending endless conveyor 46 to pass beneath the lower run of the pusher bar operating chains 64, the sprockets 76 are disposed a vertical distance above the pan supporting surface of the endless conveyor 46 greater than the height of the pans being conveyed, and the lower runs of the chains 64 are retained in longitudinally extending tracks 86 including a horizontal forward portion extending from the lower peripheral portion of the sprockets 76 at least across the width of the endless conveyor 46 and a downwardly sloping rearward portion extending to the lower peripheral portion of the sprockets 66. The upper runs of the chains 64 are retained in longitudinally extending tracks 88 extending from the upper peripheral portion of the sprockets 66 to the upper peripheral portion of the sprockets 72, to prevent sagging or buckling of the chains 64. The tracks 86 and 88 are rigidly secured in any suitable manner to the inner faces of the inner sheets 16 of the oven side walls 14 and the inner faces of the inner sheets 36 of the compartments 34.

Secured, as by welding, to opposite end portions of the pusher bar 62 are arms 90 extending perpendicularly therefrom. The free ends of the arms 90 are pivotally mounted on pintles 92 secured to and extending laterally inward of the sides of the chains 64. The arms 90 are of substantially greater length than the vertical distance between the horizontal portion of the lower runs of the chains 64 and the pan supporting surface of the endless conveyor 46, and with the pusher connected ends of the arms 90 being disposed rearward of their chain connected ends and the chains operating in counterclockwise direction, as viewed in FIGURE 1, the pusher bar 62 reaches into the oven beyond the rearward ends of the chains 64 to push the pans onto the oven hearth 24. With the lower peripheral portions of sprockets 66 disposed closely above the surface of the shelf 60 and the rearward portion of the lower run of chains 64 being guided in the downwardly and rearwardly sloping rearward portion of tracks 86, as previously described, it will be seen that a maximum reach of the pusher bar 62 into the oven is provided.

Intermediate its ends, each of the side bars 90 of the pusher bar 62 has rigidly secured thereto a perpendicularly upwardly projecting arm 94. Each end of the pusher bar 62 is provided with an outboard guide abutment or roller 96 and each of the arms 94 is provided at its free end with an inboard guide abutment or roller 98. Means, hereinafter particularly described, cooperate with the outboard and inboard rollers 96 and 98 to guide the pusher bar 62 along its aforementioned pan pushing path and its elevated retracting path, and to transfer it from one to the other of said paths in a smooth and gentle manner. For a reason to be explained later, the loader 12 is shown provided with a second pusher bar connected to the chains 64 half way therearound from the pusher bar 62. The second pusher bar and its associated parts are the same in all respects to the pusher bar 62 and its associated parts, and similar parts are identified by similar references characters followed by a prime mark. Disposed in the vertical longitudinal plane of each of the inboard rollers 98 is a guide shoe 100. The guide shoes 100 extend from above the level of the rearward portion of the upper runs of the chains 64 downwardly and rearwardly beyond the rearmost ends of the chains 64, and are rigidly supported on the inner ends of brackets 102 that are secured to and extend inwardly of the inner sheets 16 of the oven side walls 14.

Figure 5:
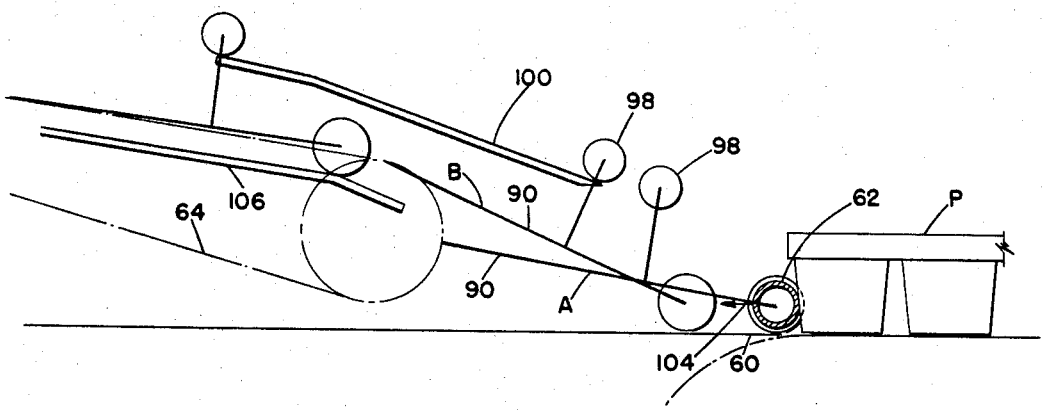

The rearward ends of the guide shoes 10 are disposed a distance forward of the pusher bar 62 in the rearmost extended position of the latter, as diagrammatically illustrated in FIGURE 5 at position A, and a distance above the plane of the pan supporting shelf 60 such that as pusher bar 62 approaches position A, the inboard rollers 98 pass beneath and somewhat beyond the rearward ends of the guide shoes 100. Now, as the chain connected ends of the pusher arms 90 are moved by the chains 64 from position A to position B, the pusher bar 62 retraces its path for a short distance as shown in FIGURE 5, by the arrowed path 104 of the pusher bar 62, so that the pusher bar 62 is pulled away from a loaded pan P in a short horizontal path to thereby prevent the pusher bar 62 from engaging the usual pan strap or the covers of the pans where covered pans are employed and raising and dropping the forward end of the loaded pan, and thereby avoid shock to the raised dough in the pan that might otherwise cause the sensitive raised dough to fall. At position B of the pusher, the inboard rollers 98 will have been raised to a position where they will engage the lower rearward end of the guide shoes 100.

As the chain connected ends of the pusher arms 90 are moved forwardly from position B along the upper chain run, the inboard rollers 98 roll along the sloping guide shoes 100 thereby progressively raising the pusher bar 62 so that as the inboard rollers reach and ride off the forward end of the guide shoes 100, the outboard rollers 96 of the pusher bar 62 engage and ride along the sloping rearward portion of the elongated guide support strips 106 to retain the pusher bar 62 in an elevated position. The sloping portions of the guide support strips 106 are in effect inwardly projecting extensions of the lower rails of the chain tracks 88. The horizontal forward portion of the guide support strips 106 extend across and somewhat beyond the sides of the pan conveyor 46 and are in effect inwardly projecting extensions of the upper rails of the chain tracks 86, so that on its retracting stroke the pusher bar is disposed above the row of pans being conveyed by the conveyor 46 into position to be loaded. Also, when two pushers are employed, one pusher bar and its outboard rollers will pass over the pivotal chain connected end of the arms of the other pusher bar.

In order to prevent free fall of the pusher bar 62 as it leaves the forward end of the guide support strips 106 and descends to the forward extension 108 of the pan supporting surface 44 and to thereby eliminate undesirable jarring and banging, the invention contemplates novel means for effecting smooth and gentle descent of the pusher bar 62. A downwardly and forwardly sloping guide shoe 110 is disposed in the path of each of the inboard rollers 98, each of the guide shoes 110 being fastened in suitable manner to the outer face of the vertical leg 112 of a corner bracket 114 that projects inwardly from the upper forward corner of a respective compartment 34, as best shown in FIGURES 1 and 2.

Referring particularly to diagrammatic FIGURE 4, the guide shoes 110 are disposed so that in position C of the pusher, with the outboard rollers 96 about to leave the forward end of the guide support strips 106, the inboard rollers 98 engage the upper rearward end of the guide shoes 110. As the chain connected ends of the pusher arms 90 are moved forwardly from position C along the upper chain run to position D adjacent the upper peripheral portion of sprockets 72, inboard rollers 98 ride downwardly and rearwardly along the guide shoes to a position where they are about to leave the guide shoes and support the pusher as the outboard rollers 96 leave the guide support strips 106. In position D of the pusher, each of the outboard rollers 96 is disposed to engage the upper forward end portion of a downwardly and rearwardly sloping guide shoe 115 that terminates on the extension 108 of the pan supporting surface 44. The guide shoes 115 are suitably secured to and extend inwardly of the inner sheets 36 of the compartments 34. As the chain connected ends of the pusher arms 90 move from position D along the runs of the chains 64 around the sprockets 72 to approximately half way down the previously referred to short vertical portion of the chain run between the sprockets 74 and 76 to position E in FIGURE 4, which corresponds to the position of the pusher 62 and its associated elements in FIGURE 1; the inboard rollers 98 move off the end of the guide shoes 110 and pass thereunder while the outboard rollers 96 roll down the guide shoes 115 and along the extension 108 of the pan supporting surface 44 to support the pusher bar 62 and move it into engagement with the forward sides of the row of pans on the endless conveyor 46. Since the chain connected ends of the pusher arms 90 are moving along the short vertical run portion of the chains 64 just before and after the pusher bar 62 engages the row of pans, the rearward rate of travel of the pusher bar 62 is slowed up to thereby soften impact of the pusher bar 62 against the pans and minimize possibility of falling of the proofed dough.

The chain connected ends of the pusher arms 90 now move from position E rearwardly along the lower runs of the chains 64 and the outboard rollers 96 roll along the pan supporting surface 44 to move the pusher bar 62 rearwardly in close proximity thereover to push the row of pans onto the traveling hearth 24 of the oven.

The operation of the pusher 62 and its associated elements, as above described, applies in similar manner to pusher bar 62' and its associated elements, and it is apparent that the loader may employ one or two pusher bars. With two pusher bars, the loader can be operated at one half the speed as with one pusher bar for the same loading capacity. This is particularly advantageous where the pans must be pushed a considerable distance from the pan conveyor 46 to oven hearth.

The drive for the pusher operating endless chains 64 includes a motor 116 and gear reducer 118 suitably mounted in one of the compartments 34. A sprocket chain 120 is trained around a sprocket 121 on the output shaft of the speed reducer 118 and a sprocket 122 on the through shaft 124 suitably journaled in bearings carried by the compartments 34. Sprocket chains 126 are trained over sprockets (not shown) on the ends of through shaft 124 and sprockets 128 on extensions of the stub shafts 68.

While the loading means has been shown for purpose of illustration as applied to a tunnel type oven, it is apparent that it is equally adapted for the loading of pans of dough onto successive trays of a traveling tray type oven well known in the art.

Although I have disclosed an exemplary embodiment of my invention, it will be understood that various changes, modifications and substitutions may be incorporated in such embodiment without departing from the spirit of the invention.

I claim:

1. A reciprocating transfer device for slidingly moving articles across an article support including,
   a pair of parallel laterally spaced endless chains spaced above said support defining closed loops having upper and lower runs;
   means for driving said chains;
   a transversely extending article pusher bar;
   connecting arms pivotally connected at one end to said chains and connected at the other end to opposite end portions of said pusher bar to move said pusher bar in an article pushing path as the chain connected ends of said connecting arms travel along said lower chain runs and in a retracting path as the chain connected ends of said connecting arms travel along said upper chain runs;

a longitudinally extending guide track disposed inward of each of said endless chains and spaced above said support;

an outboard guide member on each end of said pusher bar engaging said article support for guiding said pusher bar in said article pushing path and engaging said guide track for guiding said pusher bar in said retracting path at an elevation above articles on said first support;

a control arm projecting in an upward direction from each of said connecting arms;

an inboard guide member at the free end of each of said control arms;

a rearwardly and downwardly sloping guide shoe offset inwardly of each of said guide tracks above the plane of the rearward terminal portions thereof and extending rearwardly therebeyond providing for passage thereunder of said inboard guide members as the pusher bar approaches the end of its pushing path and adapted to be engaged by said inboard guide members as the chain connected ends of said pusher bar connecting arms move from said lower to and along said upper chain runs to elevate said pusher bar and to effect engagement of said outboard guide members with said guide tracks as said inboard guide members disengage said guide shoes to maintain said pusher bar in elevated position in its retracting path.

2. An oven loading device comprising a horizontal pan support at the entry end of the oven including a conveyor for feeding a row of pans transversely in front of said oven;

a pair of parallel laterally spaced endless chains above said support defining closed loops having upper and lower runs with at least a portion of said lower chain runs bridging said conveyor at an elevation exceeding the height of the pans on said conveyor;

means for driving said chains;

a longitudinally extending guide track disposed inward of each of said endless chains at an elevation above said pan support exceeding the height of the pans thereon;

a transversely extending pusher bar;

connecting arms pivotally connected at one end to said chains and connected at the other end to opposite end portions of said pusher bar to move said pusher bar in a pan pushing path as the chain connected ends of said connecting arms travel along said lower chain runs and in a retracting path as the chain connected ends of said connecting arms travel along said upper chain runs;

an outboard roller on each end of said pusher bar engaging said pan support for guiding said pusher bar in said pan pushing path and engaging said guide track for guiding said pusher bar in said retracting path at an elevation above any pans on said transverse conveyor;

control arms projecting in an upward direction from said connecting arms intermediate the ends thereof;

an inboard roller at the free end of each of said control arms;

a longitudinally extending guide shoe in the vertical longitudinal plane of each of said inboard rollers above the plane of the rearward terminal portions of said guide tracks and extending rearwardly therebeyond providing for passage thereunder of said inboard rollers as the pusher bar approaches the end of its pushing path and adapted to be engaged by said inboard rollers as the chain connected ends of said pusher bar connecting arms move from said lower to and along said upper chain runs to elevate said pusher bar and to effect engagement of said outboard rollers with said guide tracks as said inboard rollers disengage said guide shoes to maintain said pusher bar in elevated position in its retracting path.

3. A reciprocating transfer device for slidingly moving articles across an article support including, a pair of parallel laterally spaced endless chains above said support defining closed loops having upper and lower runs;

means for driving said chains;

a transversely extending article pusher bar;

connecting arms pivotally connected at one end to said chains and connected at the other to opposite end portions of said pusher bar to move said pusher bar in an article pushing path as the chain connected ends of said connecting arms travel along said lower chain runs and in a retracting path as the chain connected ends of said connecting arms travel along said upper chain runs;

said lower chain run having a forward portion bridging a forward portion of said article support at an elevation exceeding the height of any articles thereon and a rearward portion sloping rearwardly and downwardly over a rearward portion of said article support to a position superjacent said article support;

a longitudinally extending guide track disposed inward of each of said chains and spaced above said article support;

an outboard guide member on each end of such pusher bar engaging said article support for guiding said pusher bar in said article pushing path and engaging said guide track for guiding said pusher bar in said retracting path;

a control arm projecting in an upward direction from each of said connecting arms;

a rearwardly and downwardly sloping guide shoe offset inwardly of each of said guide tracks above the plane of the rearward terminal portions thereof and extending rearwardly therebeyond providing for passage thereunder of said inboard guide members as the pusher bar approaches the end of its pushing path and adapted to be engaged by said inboard guide members as the chain connected ends of said pusher bar connecting arms move from said lower to and along said upper chain runs to elevate said pusher bar and to effect engagement of said outboard guide members with said guide tracks as said inboard guide members disengage said guide shoes to maintain said pusher bar in elevated position in its retracting path.

4. A transfer device as set forth in claim 3, wherein said forward portion of said article support includes a transversely extending endless conveyor for conveying successive rows of articles transversely into position to be pushed by said pusher bar.

5. A reciprocating transfer device for slidingly moving articles across an article support including, a pair of parallel laterally spaced endless chains spaced above said support defining closed loops having upper and lower runs;

means for driving said chains;

a transversely extending article pusher bar;

a connecting arms pivotally connected at one end to said chains and connected at the other end to opposite end portions of said pusher bar to move said pusher bar in an article pushing path as the chain connected ends of said connecting arms travel along said lower chain runs and in a retracting path as the chain connected ends of said connecting arms travel along said upper chain runs;

a longitudinally extending guide track disposed inward of each of said endless chains and spaced above said article support;

an outboard guide member on each end of said pusher bar engaging said article support for guiding said pusher bar in said article pushing path and engaging said guide track for guiding said pusher bar in said retracting path at an elevation above articles on said support;
a control arm projecting in an upward direction from each of said connecting arms;
an inboard guide member at the free end of each of said control arms;
a forwardly and downwardly sloping guide shoe offset inwardly of and spaced above said guide tracks and extending forwardly of the forward ends thereof, the upper end of said guide shoes being disposed to be engaged by said inboard guide members as said outboard guide members disengage said guide tracks and as the chain connected ends of said connecting arms approach the forward end of the upper run of said chains to support said pusher bar during an initial portion of its descent toward said article support as said inboard guide members move downwardly and forwardly along said guide shoes; and
second guide shoes spaced below said first guide shoes sloping upwardly and forwardly from the forward end portion of said article support disposed to be engaged by said outboard guide members as said inboard guide members disengage said first named guide shoes to support said pusher bar as it descends to said article support and as the chain connected ends of said connecting arms descend from said upper toward said lower chain runs.

6. A reciprocating transfer device for slidingly moving articles across an article support including.
a pair of parallel laterally spaced endless chains spaced above said support defining closed loops having upper and lower runs;
means for driving said chains;
a transversely extending article pusher bar;
connecting arms pivotally connected at one end to said chains and connected at the other end to opposite end portions of said pusher bar to move said pusher bar in an article pushing path as the chain connected ends of said connecting arms travel along said lower chain runs and in a retracting path as the chain connected ends of said connecting arms travel along said upper chain runs;
a longitudinally extending guide track disposed inward of each of said endless chains and spaced above said article support;
an outboard guide member on each end of said pusher bar engaging said article support for guiding said pusher in said article pushing path and engaging said guide track for guiding said pusher bar in said retracting path at an elevation above articles on said support;
a control arm projecting in an upward direction from each of said connecting arms;
an inboard guide member at the free end of each of said control arms;
a rearwardly and downwardly sloping rear guide shoe spaced above the rearward terminal portions of said guide tracks and extending rearwardly therebeyond providing for passage thereunder of said inboard guide members as the pusher bar approaches the end of its pushing path and adapted to be engaged by said inboard guide members as the chain connected ends of said pusher bar connecting arms move from said lower to and along said upper chain runs to elevate said pusher bar and to effect engagement of said outboard guide members with said guide tracks as said inboard guide members disengage said rear guide shoes to maintain said pusher bar in elevated position in its retracting path;
a forwardly and downwardly sloping front guide shoe spaced above and extending forwardly of the forward ends of said guide tracks, the upper end of said front guide shoes being disposed to be engaged by said inboard guide members as said outboard guide members disengage said guide tracks and as the chain connected ends of said connecting arms approach the forward end of the upper run of said chains to support said pusher bar during an initial portion of its descent toward said article support as said inboard guide members move downwardly and forwardly along said front guide shoes; and
second front guide shoes spaced below said first front guide shoes sloping upwardly and forwardly from the forward end portion of said article support disposed to be engaged by said outboard guide members as said inboard guide members disengage said first front guide shoes to support said pusher bar as it descends to said article support and as the chain connected ends of said connecting arms descend from said upper toward said lower chain runs.

References Cited
UNITED STATES PATENTS 3,196,811   7/1965   Lefever _____ 107—57

WALTER A. SCHEEL, *Primary Examiner.*

J. SHEA, *Assistant Examiner.*

U.S. Cl. X.R.

198—24